(12) United States Patent
Sensui

(10) Patent No.: US 6,370,333 B1
(45) Date of Patent: Apr. 9, 2002

(54) MULTIPOINT FOCUS DETECTING APPARATUS

(75) Inventor: Takayuki Sensui, Tokyo (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/694,475

(22) Filed: Oct. 24, 2000

(30) Foreign Application Priority Data

Oct. 25, 1999 (JP) ............................................ 11-302561

(51) Int. Cl.$^7$ ................................................. G03B 7/28
(52) U.S. Cl. ....................... 396/114; 396/113; 250/201.8
(58) Field of Search ................................. 396/104, 111, 396/114, 121, 113, 112; 250/201.8

(56) References Cited

U.S. PATENT DOCUMENTS

| | | | |
|---|---|---|---|
| 5,206,498 A | * | 4/1993 | Sensui ..................... 250/201.08 |
| 5,321,248 A | | 6/1994 | Sensui |
| 5,397,887 A | | 3/1995 | Sensui |
| 5,530,236 A | | 6/1996 | Sensui |
| 5,646,393 A | | 7/1997 | Sensui |
| 5,845,155 A | | 12/1998 | Nakata et al. |
| 6,115,553 A | | 9/2000 | Iwamoto |

FOREIGN PATENT DOCUMENTS

| | | |
|---|---|---|
| JP | 6-088938 | 3/1994 |
| JP | 7-301746 | 11/1995 |

* cited by examiner

*Primary Examiner*—Russell Adams
*Assistant Examiner*—Arthur A Smith
(74) *Attorney, Agent, or Firm*—Greenblum & Bernstein, P.L.C.

(57) ABSTRACT

A multipoint focus detecting apparatus of a camera includes a plurality of exit-pupil dividing devices for dividing an exit pupil of a photographing lens into a plurality of detection sub-zones which correspond to a plurality of arrays of light receiving elements; a plurality of pairs of light distribution forming devices, each of which receives light bundles which are passed through a corresponding pair of the plurality of detection sub-zones to form a corresponding pair of light distributions; a focus detection zone determining device; and a light intercepting member which is positioned in a vicinity of an intersection between the at least two light bundles so that each of the at least two light bundles is not incident on any of the plurality of arrays of light receiving elements other than a corresponding one of the plurality of arrays of light receiving elements.

13 Claims, 4 Drawing Sheets

MULTIPOINT FOCUS DETECTING APPARATUS

BACKGROUND OF THE INVENTION

1. Field of the Invention

The present invention relates to a multipoint focus detecting apparatus which can determine a focus state at each of a plurality of focus detection zones, and which is suitable for an optical instrument such as an SLR camera.

2. Description of the Prior Art

In recent years, SLR cameras provided with a multipoint focus detecting unit for determining a focus state (defocus) at each of a plurality of focus detection zones (focusing points) have been developed. In the optical system of a conventional multipoint focus detecting unit, in addition to the central focus detection zone arranged over the optical axis, one or more off-center focus detection zones are arranged away from the optical axis, and light bundles which form an object image which are passed through the central and off-center focus detection zones are respectively deflected by corresponding mirrors to be incident on corresponding light receiving elements arranged in a horizontal line. For instance, a light bundle of an object image that is passed through the horizontally-elongated central focus detection zone is deflected once by a mirror to be focused on a corresponding horizontally-elongated array of light receiving elements. The image observed through the horizontally-elongated central focus detection zone is divided into two, by a corresponding pair of separator lenses, to be formed as two separate images on the corresponding horizontally-elongated array of light receiving elements. At the same time, another light bundle of the object image which is passed through a vertically elongated off-center focus detection zone is deflected twice by two mirrors to be focused on a corresponding horizontally-elongated array of light receiving elements. The image observed through the vertically-elongated off-center focus detection zone is divided into two by a corresponding pair of separator lenses to be formed as two separate images on the corresponding horizontally-elongated array of light receiving elements. The central and off-center pairs of separator lenses are arranged away from the central and off-center light receiving elements by a predetermined distance.

FIG. 4 is a developed view of an optical path of a conventional multipoint focus detecting apparatus, showing optical paths thereof. Note that none of the aforementioned deflecting mirrors are, for clarity, shown in FIG. 4. A field mask 101, positioned in a plane located at a position optically equivalent with a film surface (i.e., a focal plane of the photographing lens), is provided with two focus detection apertures 101a and 101b which respectively determine two off-center focus detection zones (e.g., a left focus detection zone and a leftmost focus detection zone) arranged away from the center of the field of view. A light bundle La, which is passed through the aperture (e.g., the aforementioned left focus detection zone) 101a and a condenser lens 103a, is firstly deflected by a prism 105a in an outward direction (i.e., in a downward direction as viewed in FIG. 4), and is subsequently deflected by a prism 107a in a direction to be substantially parallel to the optical axis O of a photographing lens (not shown). Subsequently, the light bundle passes through a separator mask 109a provided as an exit-pupil dividing device and a pair of separator lenses 11a to be incident on a corresponding line sensor 113a, so that a couple of object images (a couple of light distributions) are formed on the line sensor 113a.

On the other hand, a light bundle Lb, which is passed through another aperture (e.g., the aforementioned leftmost focus detection zone) 101b, that is positioned farther from the optical axis O than the aperture 101a, and a condenser lens 103b, is firstly deflected by a prism 105b in an inward direction (i.e., in an upward direction as viewed in FIG. 4), and is subsequently deflected by a prism 107b in a direction to be substantially parallel to the optical axis O. Subsequently, the light bundle passes through a separator mask 109b provided as an exit-pupil dividing device, and a pair of separator lenses 111b to be incident on a corresponding line sensor 113b, so that a couple of object images (a couple of light distributions) are formed on the line sensor 113b. Each of the line sensors 113a and 113b extends in a direction normal to a surface of the drawing of FIG. 4, and the two light bundles which are passed through the two separator masks 109a and 109b are incident on the two line sensors 113a and 113b to be formed as two object images thereon, respectively.

Among the light bundle Lb that is passed through the focus detection aperture 101b, for instance, there is a stray light bundle Lb' that is incident on the separator mask 109a, rather than the separator mask 109b. If the line sensor 113a receives such a stray light bundle that is passed through the focus detection aperture 101b, the object image of the stray light bundle is formed on the line sensor 113a. This deteriorates the precision in detection of the multipoint focus detecting apparatus. In some cases, the multipoint focus detecting apparatus cannot determine a focus state due to such a stray light bundle.

SUMMARY OF THE INVENTION

The present invention has been made in view of the aforementioned problems that reside in conventional multipoint focus detecting apparatuses, and an object of the present invention is to provide a multipoint focus detecting apparatus which can prevent any stray light which may cause a focus detection error from occurring.

To achieve the object mentioned above, according to an aspect of the present invention, a multipoint focus detecting apparatus of a camera is provided, including a plurality of exit-pupil dividing devices for dividing an exit pupil of a photographing lens into a plurality of detection sub-zones, the plurality of detection sub-zones corresponding to a plurality of arrays of light receiving elements arranged in a second direction orthogonal to a first direction in which the exit pupil is divided by each of the plurality of exit-pupil dividing devices; a plurality of pairs of light distribution forming devices, each of the pairs of light distribution forming devices receiving light bundles which are passed through a corresponding pair of the plurality of detection sub-zones to form a corresponding pair of light distributions, respectively, relative positions of which vary in accordance with a variation in position of a focal point of the photographing lens; a focus detection zone determining device that is positioned in a plane located substantially at a position optically equivalent with a focal plane of the photographing lens to determine the plurality of focus detection zones, at least two light bundles which are respectively passed through corresponding at least two of the plurality of focus detection zones being respectively incident on corresponding at least two of the plurality of exit-pupil dividing devices after intersecting each other; and a light intercepting member which is positioned in a vicinity of an intersection between the at least two light bundles so that each of the at least two light bundles is not incident on any of the plurality of arrays of light receiving elements other than a corresponding one of the plurality of arrays of light receiving elements.

Preferably, at least one condenser lens positioned between the focus detection zone determining device and the plurality of exit-pupil dividing devices is included so that the light bundles which are respectively passed through the plurality of focus detection zones pass through the at least one condenser lens.

In an embodiment, each of the plurality of exit-pupil dividing devices includes a separator mask having at least two apertures.

In an embodiment, each pair of the plurality of pairs of light distribution forming devices includes a pair of separator lenses.

Preferably, each of the plurality of arrays of light receiving elements is a CCD line sensor.

Preferably, the focus detection zone determining device is a field mask having a plurality of apertures which determine the plurality of focus detection zones, respectively.

Preferably, the multipoint focus detecting apparatus is incorporated in an SLR camera.

Preferably, the light intercepting member includes an opening.

According to another aspect of the present invention, a multipoint focus detecting apparatus is provided, having a plurality of focus detecting zones arranged in a first pattern on a predetermined focal plane, and a corresponding plurality of arrays of light receiving elements which are arranged in a second pattern that is different from the first pattern. A corresponding plurality of light bundles which are passed through the plurality of focus detecting zones are made incident on the plurality of arrays of light receiving elements, respectively; the plurality of focus detecting zones being off-center with respect to a center of the focal plane. The plurality of focus detecting zones includes a first off-center focus detection zone, and a second off-center focus detection zone which are positioned on a same side on the focal plane with respect to the center thereof, the second off-center focus detection zone being positioned farther from the center of the focal plane than the first off-center focus detection zone. The multipoint focus detecting apparatus includes at least one light deflector which deflects a first light bundle and a second light bundle which are respectively passed through the first off-center focus detection zone and the second off-center focus detection zone in directions to intersect each other; a first light reflector which reflects each of the first and second light bundles deflected by the at least one light deflector; a second light reflector which reflects each of the first and second light bundles, reflected by the first light reflector, towards a corresponding one array of the plurality of arrays of light receiving elements; and a light intercepting member which is positioned in a vicinity of an intersection between the first light bundle and the second light bundles so that each of the first light bundle and the second light bundle is not incident on any of the plurality of arrays of light receiving elements other than the corresponding one of the plurality of arrays of light receiving elements.

Preferably, at least one light deflector is designed and arranged so that the first and second light bundles reflected by the first reflector are incident on the second reflector after intersecting each other, and wherein the light intercepting member is positioned between the first reflector and the second reflector.

Preferably, the multipoint focus detecting apparatus is incorporated in an SLR camera.

Preferably, the light intercepting member includes an opening.

The present disclosure relates to subject matter contained in Japanese Patent Application No. 11-302561 (filed on Oct. 25, 1999) which is expressly incorporated herein by reference in its entirety.

BRIEF DESCRIPTION OF THE DRAWINGS

The present invention will be described below in detail with reference to the accompanying drawings, in which.

DESCRIPTION OF THE PREFERRED EMBODIMENT

Figure 3:
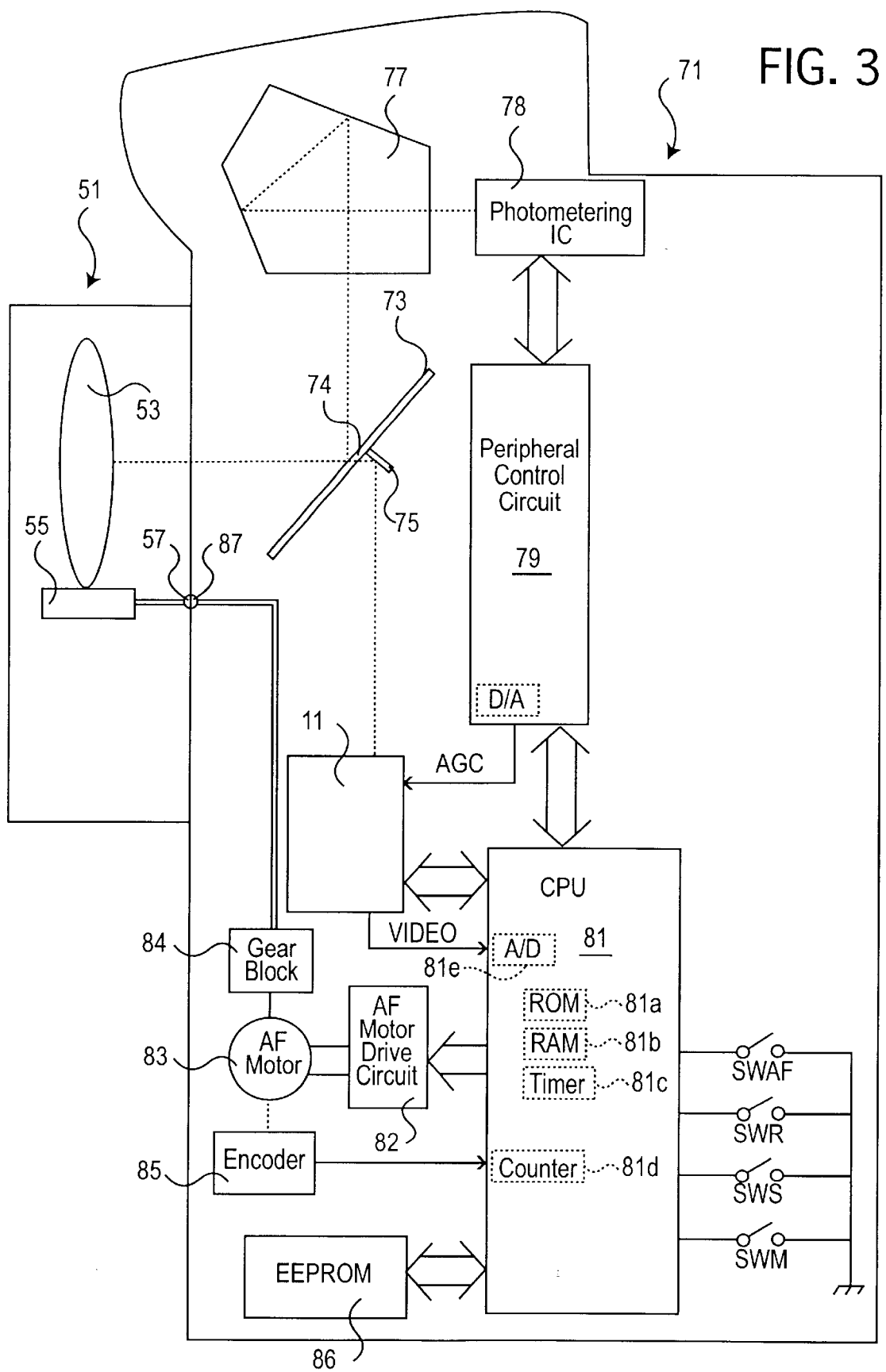
FIG. 3 is a block diagram of fundamental components of a single lens reflex camera provided with the multipoint focus detecting apparatus shown in FIG. 1.
Figure 4:
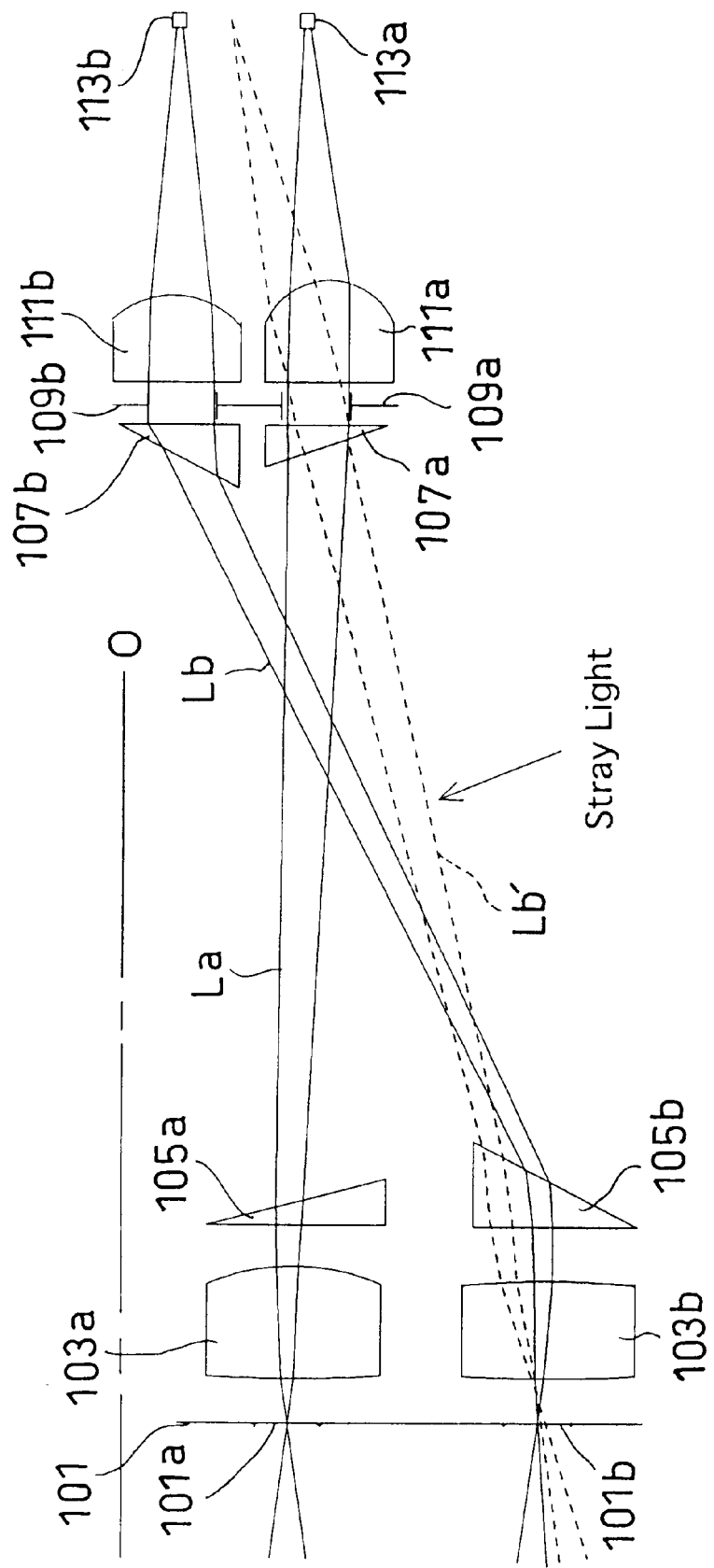
FIG. 4 is a developed view of an optical path of a conventional multipoint focus detecting apparatus showing optical paths thereof.

FIG. 3 shows a block diagram of fundamental elements of an SLR (single-lens-reflex) camera system provided with a multipoint focus detecting apparatus to which the present invention is applied. The autofocus SLR camera system includes a camera body 71 and an interchangeable photographing lens 51 detachably attached to the camera body 71. The camera body 71 is provided with a multipoint focus detecting apparatus and an autofocusing device (multipoint autofocusing system) which moves a focusing lens group 53 of the photographing lens 51 to an in-focus position in accordance with the result of detection of the multipoint focus detecting apparatus.

A major part of object light (light which is to form an object image to be photographed) entering the camera body 71 through the photographing lens 51 is reflected by a main mirror (quick-return mirror) 73 toward a pentagonal prism 77, which is a fundamental element of a finder optical system in the camera body 71. Subsequently, the object light is reflected more than once by the pentagonal prism 77 and emerges out of an eyepiece (not shown) positioned behind the pentagonal prism 77. Part of the light reflected by the pentagonal prism 77 enters a light-receiving element of a photometering IC 78. Part of the object light which is incident on the main mirror 73 passes through a half mirror portion 74 provided on the main mirror 73 to be reflected downwardly by an auxiliary mirror 75 provided at the rear of the main mirror 73. The light reflected downwardly by the auxiliary mirror 75 enters a multipoint AF sensor unit 11 that is provided as a multipoint focus detecting apparatus. The multipoint AF sensor unit 11 can be, for example, a phase-difference distance measuring sensor. The multipoint AF sensor unit 11 can determine a focus state (defocus) at each of six focus detection zones which are determined by six focus detection apertures (slots) 21A through 21F formed on a field mask 21 (see FIG. 1). The multipoint AF sensor unit 11 is provided with six line sensors (six arrays of light receiving elements) 35A through 35F that respectively correspond to the six focus detection apertures 21A through 21F (see FIG. 1).

The camera body 71 is provided with a main CPU 81 that manages the overall operations of the camera body 71. The output (integral data) of the multipoint AF sensor unit 11 is input to the main CPU 81. The multipoint AF sensor unit 11, a peripheral control circuit 79 to which the photometering IC 78 is connected, an AF motor drive circuit 82 for driving an AF motor 83, an encoder 85, and an EEPROM 86 are provided within the camera body 71 and are all connected to the main CPU 81. The main CPU 81 calculates a defocus amount for each of the six line sensors 35A through 35F in accordance with a predetermined operation, using integral data of each of the six line sensors 35A through 35F that are input from the multipoint AF sensor unit 11. Subsequently, the main CPU 81 determines the defocus amount to be used, and the priority thereof, in accordance with all the calculated defocus amounts to determine and calculate the rotational direction and the number of revolutions of the AF motor 83 (i.e., the number of pulses to be output from the encoder 85), respectively. Thereafter, the main CPU 81 drives the AF motor 83 through the AF motor drive circuit 82 in accordance with the determined rotational direction and the calculated number of revolutions. The main CPU 81 detects and counts the pulses output from the encoder 85 in association with the rotation of the AF motor 83. When the counted number of pulses reaches the calculated number of pulses, the main CPU 81 sends a signal to the AF motor drive circuit 82 to stop the AF motor 83.

Rotation of the AF motor 83 is transmitted to the photographing lens 51 through a gear block 84 and a connection between a joint 87 provided on a mount of the camera body 71 and another joint 57 provided on a corresponding mount of the photographing lens 51. The photographing lens 51 is provided therein with a lens drive mechanism 55 for transmitting the rotation of the joint 57 to the focusing lens group 53, so that the focusing lens group 53 is driven by the AF motor 83 via the gear block 84, the joints 87 and 57, and the lens drive mechanism 55.

The main CPU 81 is provided therein with a ROM 81a in which predetermined programs are stored, a RAM 81b in which data for the calculating operation and control operation is temporarily stored, a counting reference timer 81c, a counter 81d, and an A/D converter 81e. The main CPU 81 controls the peripheral control circuit 79 to start operating to calculate an optimum combination of a shutter speed and an aperture value in accordance with photometry data input from the photometering IC 78. Subsequently, the main CPU 81 actuates a focal plane shutter (not shown) provided in the camera body 71 and an iris diaphragm (not shown) provided in the photographing lens 51 via the peripheral control circuit 79. Thereafter, upon the completion of an exposure, the main CPU 81 controls a film motor (not shown) to wind the film by one frame. The EEPROM 86 serving as an external memory is connected to the main CPU 81. The EEPROM 86 stores therein various inherent constants of the camera body 71 and predetermined values necessary for integration control.

A photometering switch SWS which is turned ON when a release button (not shown) is depressed by a half step, and a release switch SWR which is turned ON when the release button is fully depressed, are connected to the main CPU 81. ON/OFF data of each of the photometering switch SWS and the release switch SWR is input to the main CPU 81 so that the main CPU 81 performs predetermined operations in accordance with the ON state of each of the photometering switch SWS and the release switch SWR.

The photographing lens 51 is provided therein with the lens drive mechanism 55 for moving the focusing lens group 53 along the optical axis thereof, and the joint 57 which can be connected to the joint 87 of the camera body 71 to transmit the rotation of the AF motor 83 to the lens drive mechanism 55. The photographing lens 51 is further provided with a ROM (not shown) which stores therein various inherent constants of the photographing lens 51, or a lens CPU (not shown) for calculating variable lens information. The ROM or the CPU of the photographing lens 51 exchanges necessary data or commands with the main CPU 81 when the photographing lens 51 is connected to the camera body 71.

Figure 1:
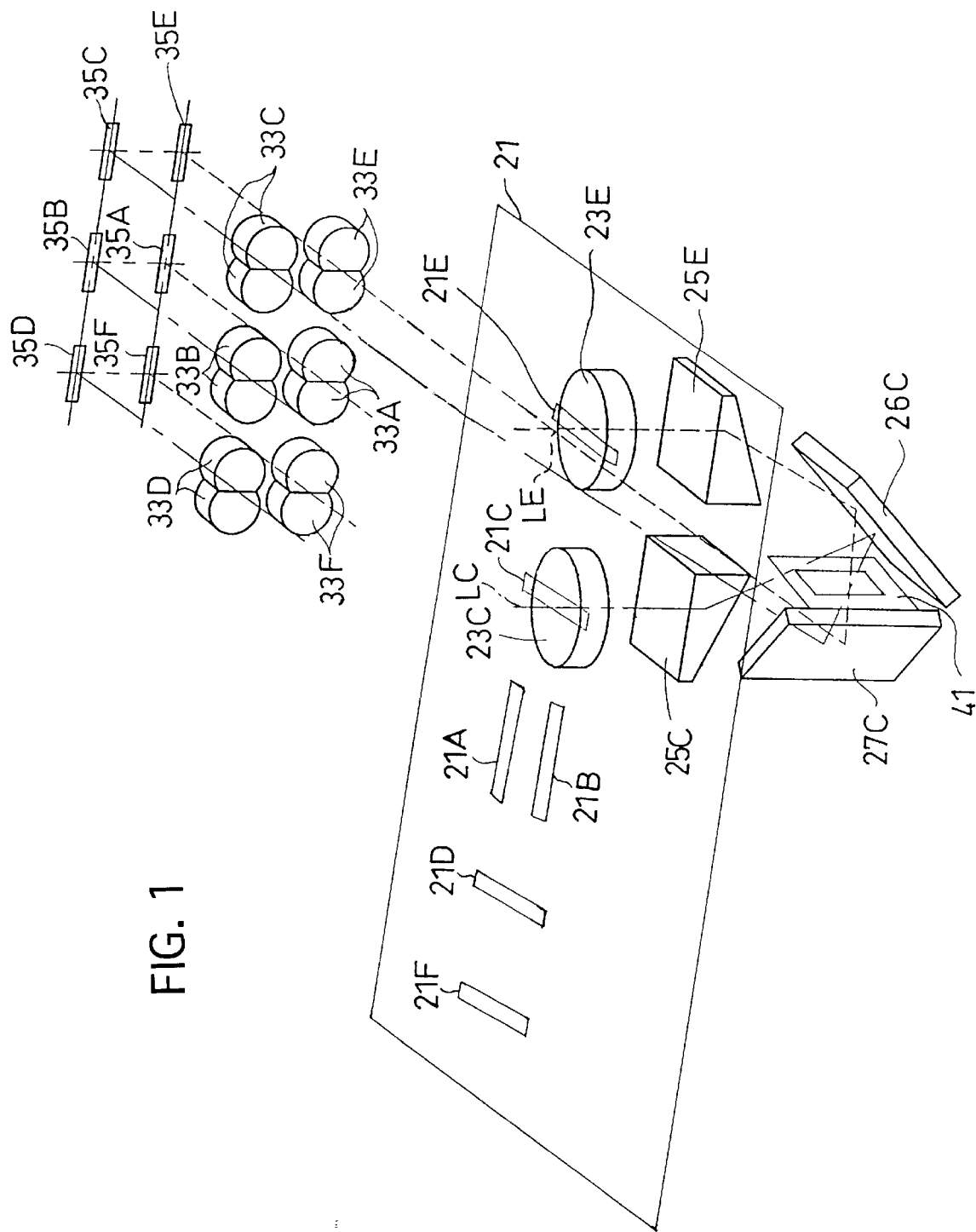
FIG. 1 is a perspective view of an embodiment of an optical system of a multipoint focus detecting apparatus according to the present invention, showing fundamental elements thereof.

The arrangement pattern of the six line sensors 35A through 35F is different from the arrangement pattern of the six focus detection zones 21A through 21F (see Fig.1). The six line sensors 35A through 35F are arranged as shown in FIG. 1 so that three line sensors (35A, 35E and 35F) are arranged at regular intervals along a lower line while the remaining three line sensors (35B, 35C and 35D) are arranged at the same regular intervals along an upper line positioned above and parallel to the lower line. The light receiving surfaces of the six line sensors 35A through 35F are positioned on a common plane.

Figure 2:
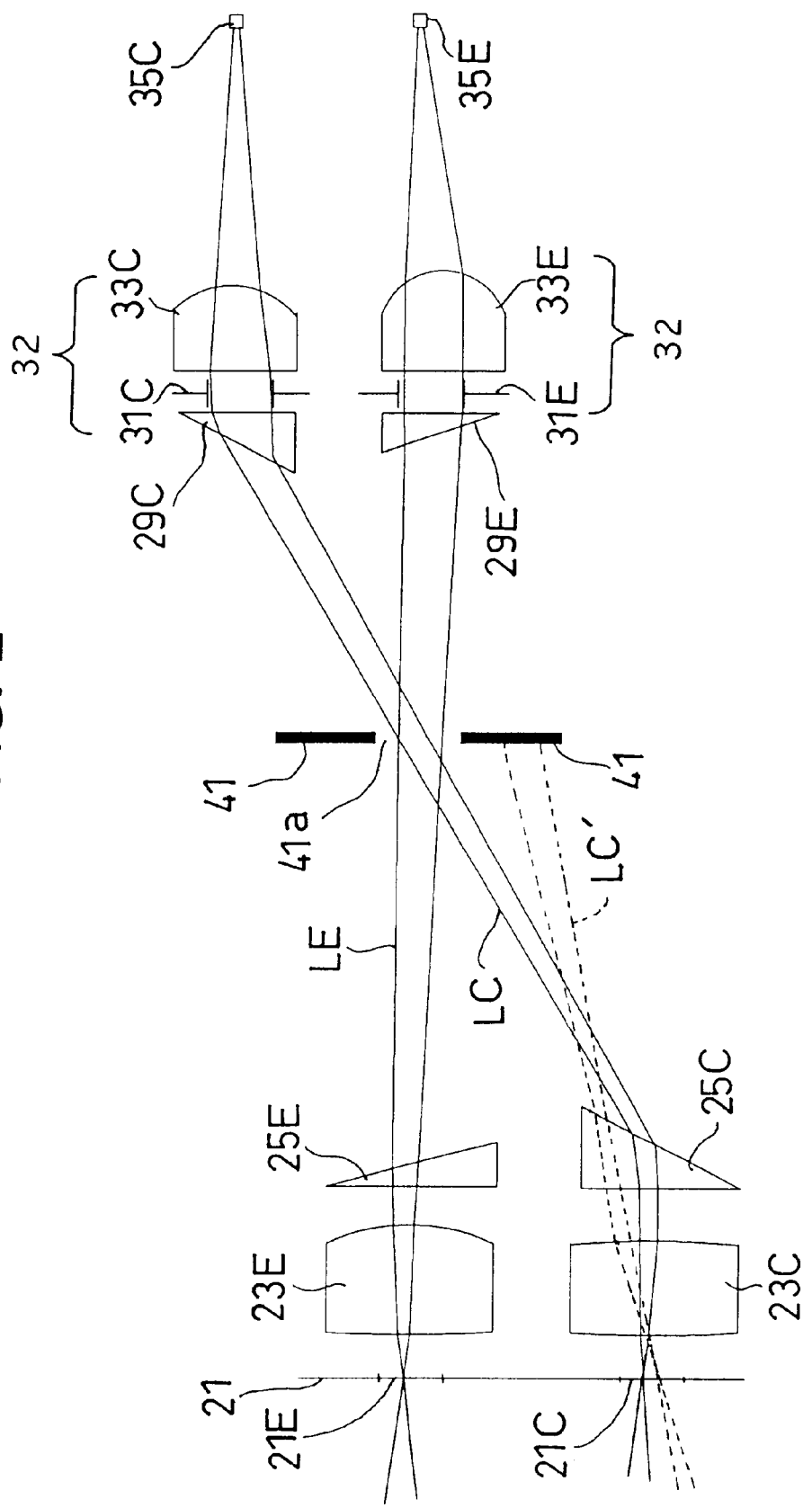
FIG. 2 is a developed view of an optical path of the embodiment of the multipoint focus detecting apparatus shown in FIG. 1, showing fundamental elements thereof.

The structure of the multipoint AF sensor unit 11 will be discussed in detail with reference to FIGS. 1 and 2. FIG. 1 is a perspective view of fundamental elements of the optical system of the multipoint AF sensor unit 11. FIG. 2 is a developed view of an optical path of multipoint AF sensor unit 11. In this particular embodiment, although the multipoint AF sensor unit 11 is provided, in a plane located at a position optically equivalent with a film surface (i.e., a focal plane of the photographing lens), with the six focus detection apertures 21 A through 21 F, only two focus detection zones represented by the two focus detection apertures 21 C and 21 E and the corresponding optical elements of the multipoint AF sensor unit 11 will be hereinafter discussed in detail. These two focus detection apertures 21C and 21E respectively determine a left focus detection zone and a leftmost focus detection zone which are positioned in the field of view of a finder view (not shown) on the left side of the center of the field of view when the camera body 71 is held horizontally. The line sensors 35C and 35E are provided to correspond to the left focus detection zone and the leftmost focus detection zone, respectively.

The light bundles LC and LE, which are passed through the apertures 21C and 21E, are converged by condenser lenses 23C and 23E and then deflected by prisms (light deflectors) 25C and 25E in directions to come close to each other, respectively. Subsequently, the light bundle LC is reflected by a first mirror (first light reflector) 26C to be incident on a second mirror (second light reflector) 27C and is reflected thereby to proceed towards the line sensor 35C. At the same time, the light bundle LE is reflected by the first mirror 26C to be incident on the second mirror 27C and is reflected thereby to proceed towards the line sensor 35E. Note that the first and second mirrors 26C and 27C are not shown in FIG. 2 for the purpose of simplifying the drawing and that the prisms 29C and 29E are not shown in FIG. 1 for the same purpose. In can be said that the light bundles LC and LE respectively deflected by the prisms 25C and 25E are reflected by the first mirror 26C in an inward direction (i.e., substantially in a direction to the left as viewed in FIG. 1) to be incident on the second mirror 27C.

The light bundle LC reflected by the second mirror 27C is incident on a prism 29C (only shown in FIG. 2) to be deflected thereby in a direction to be substantially parallel to the optical axis O. Subsequently, part of the light bundle LC deflected by the prism 29C passes through separator mask 31C to be divided into two light bundles by a pair of apertures which determine detection sub-zones (only one is shown in FIG. 2) formed on the separator mask 31C, and subsequently these two light bundles pass through a pair of separator lenses (light distribution forming device) 33C to be formed as two images on the line sensor 35C, respectively, with the two images thereon being apart from each other by a space corresponding to the focus state of the photographing lens 51, i.e., the object distance.

Likewise, the light bundle LE reflected by the second mirror 27C is incident on a prism 29E (only shown in FIG. 2) to be deflected thereby in a direction to be substantially parallel to the optical axis O. Subsequently, part of the light bundle LE deflected by the prism 29E passes through separator mask 31E to be divided into two light bundles by a pair of apertures which determine detection sub-zones (only one is shown in FIG. 2) formed on the separator mask 31E, and subsequently these two light bundles pass through a pair of separator lenses (light distribution forming device) 33E to be formed as two images on the line sensor 35E, respectively, with the two images thereon being apart from each other by a space corresponding to the focus state of the photographing lens 51, i.e., the object distance.

Separator masks 31C and 31E, and separator lenses 33C and 33E constitute an exit-pupil dividing device 32.

The optical system of the multipoint AF sensor unit 11 is provided, in the vicinity of an intersection of the two light bundles LC and LE between the first and second mirrors 26C and 27C, with a stray light intercepting mask 41. The stray light intercepting mask 41 is provided with a opening 41a. The dimensions of the opening 41a are determined so as to allow the light bundles LC and LE, which are respectively passed through the focus detection apertures 21C and 21E and incident on the separator masks 31C and 31E, to pass through the stray light intercepting mask 41, and is determined to prevent any light bundles which are passed through the aperture 21C which can enter the separator mask 31E (i.e., stray light), from passing through the stray light intercepting mask 41, and is further determined to prevent any light bundles which are passed through the aperture 21E which can enter the separator mask 31C (i.e., stray light), from passing through the stray light intercepting mask 41.

FIG. 2 shows a state in which among the light bundle which is passed through the focus detection aperture 21C, a stray light bundle LC' which travels in a direction toward the separator mask 33E is intercepted by the stray light intercepting mask 41.

As can be understood from the foregoing, according to the above illustrated embodiment of the multipoint AF sensor unit 11, any stray light bundles which are passed through the focus detection aperture 21C to travel in a direction towards the other separator mask 31E, rather than the corresponding separator mask 31C, are prevented from being incident on the other separator mask 31E, while any stray light bundles which are passed through the focus detection aperture 21 E to travel in a direction towards the other separator mask 31C, rather than the corresponding separator mask 31E, are prevented from being incident on the other separator mask 31C. This makes it possible for the multipoint AF sensor unit 11 to determine a focus state with a high degree of precision.

In FIG. 1, although a corresponding condenser lens, a corresponding prism and a corresponding mirror are not shown for each of the light bundles which are respectively passed through the focus detection apertures 21A, 21B, 21D and 21F for the purpose of simplifying the drawing, similar to each of the light bundles which are respectively passed through the focus detection apertures 21C and 21E, each of the light bundles which are respectively passed through the focus detection apertures 21A, 21B, 21D and 21F is converged by a corresponding condenser lens and then deflected by a corresponding prism and subsequently reflected by at least one mirror (light reflector) to proceed towards the corresponding line sensor 35A, 35B, 35F or 35D. Subsequently, each of these light bundles is incident on a corresponding prism to be deflected thereby in a direction to be substantially parallel to the optical axis O. Subsequently, part of each light bundle deflected by the corresponding prism passes through a corresponding separator mask to be divided into two light bundles by a pair of apertures formed on the corresponding separator mask, and subsequently these two light bundles pass through a corresponding pair of separator lenses to be formed as two images on the corresponding line sensor, respectively, with the two images thereon being apart from each other by a space corresponding to the focus state of the photographing lens 51.

In the above illustrated embodiment, although the stray light intercepting mask 41 is disposed between the first and second mirrors 26C and 27C because the two light bundles LC and LE which are respectively passed through the focus detection apertures 21C and 21E intersect each other between the first and second mirrors 26C and 27C, the present invention is not limited solely to this particular embodiment. A similar effect can be expected in the present embodiment of the multipoint focus detecting apparatus if the stray light intercepting mask is only disposed between a focus detection aperture (focus detection zone) of the field mask 21 and the corresponding separator mask which divides the exit pupil of the photographing lens into two light bundles.

As can be understood from the foregoing, according to the multipoint focus detecting apparatus of the present invention, since a light intercepting member is arranged in the multipoint focus detecting apparatus so that the light bundle which is passed through the corresponding focus detection zone is not incident on any arrays of light receiving elements other than the corresponding array of light receiving elements thereof, the multipoint focus detecting apparatus can determine a focus state with a high degree of precision, and with a high probability.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A multipoint focus detecting apparatus of a camera, comprising:

a plurality of exit-pupil dividing devices that divide an exit pupil of a photographing lens of the camera into a plurality of detection sub-zones, said plurality of detection sub-zones corresponding to a plurality of light receiving elements arranged in a second plane orthogonal to a first plane in which said exit pupil is divided;

a plurality of pairs of light distribution forming devices, each of which receives a light bundle passed through a corresponding detection sub-zone of said plurality of detection subzones, forming corresponding pairs of light distributions, a relative position of each of said pair of light distributions varying in accordance with a variation in a position of a focal point of said photographing lens;

a focus detection zone determining device, positioned in a plane located substantially at a position optically equivalent to a focal plane of said photographing lens and determining a plurality of focus detection zones, at least two light bundles passing through corresponding at least two of said plurality of focus detection zones and being respectively incident on corresponding at least two of said plurality of exit-pupil dividing devices after intersecting each other; and a light intercepting member positioned in a vicinity of the intersection of said at least two light bundles, preventing each of said at least two light bundles from being incident on any of said plurality of light receiving elements other than at least two of said plurality of light receiving elements corresponding to the at least two of said plurality of exit-pupil dividing devices.

2. The multipoint focus detecting apparatus according to claim 1, further comprising at least one condenser lens positioned between said focus detection zone determining device and said plurality of exit-pupil dividing devices so that said light bundles which are respectively passed through said plurality of focus detection zones pass through said at least one condenser lens.

3. The multipoint focus detecting apparatus according to claim 1, wherein each of said plurality of exit-pupil dividing devices comprises a separator mask having at least two apertures.

4. The multipoint focus detecting apparatus according to claim 1, wherein each pair of said plurality of pairs of light distribution forming devices comprises a pair of separator lenses.

5. The multipoint focus detecting apparatus according to claim 1, wherein each of said plurality of light receiving elements comprises a CCD line sensor.

6. The multipoint focus detecting apparatus according to claim 1, wherein said focus detection zone determining device comprises a field mask having a plurality of apertures which determine said plurality of focus detection zones, respectively.

7. The multipoint focus detecting apparatus according to claim 1, wherein said multipoint focus detecting apparatus is incorporated in an SLR camera.

8. The multipoint focus detecting apparatus according to claim 1, wherein said light intercepting member comprises an opening.

9. A multipoint focus detecting apparatus having a plurality of focus detecting zones arranged in a first pattern on a predetermined focal plane, and a corresponding plurality of arrays of light receiving elements which are arranged in a second pattern that is different from said first pattern;

wherein a corresponding plurality of light bundles which are passed through said plurality of focus detecting zones are made incident on said plurality of arrays of light receiving elements, respectively, said plurality of focus detecting zones being off-center with respect to a center of said focal plane; and wherein said plurality of focus detecting zones comprises a first off-center focus detection zone, and a second off-center focus detection zone which are positioned on a same side on said focal plane with respect to said center thereof, said second off-center focus detection zone being positioned farther from said center of said focal plane than said first off-center focus detection zone;

said multipoint focus detecting apparatus comprising:
at least one light deflector which deflects a first light bundle and a second light bundle which are respectively passed through said first off-center focus detection zone and said second off-center focus detection zone in directions to intersect each other;

a first light reflector which reflects each of said first and second light bundles deflected by said at least one light deflector;

a second light reflector which reflects each of said first and second light bundles, reflected by said first light reflector, towards a corresponding one array of said plurality of arrays of light receiving elements; and a light intercepting member which is positioned in a vicinity of an intersection between said first light bundle and said second light bundles so that each of said first light bundle and said second light bundle is not incident on any of said plurality of arrays of light receiving elements other than said corresponding one of said plurality of arrays of light receiving elements.

10. The multipoint focus detecting apparatus according to claim 9, wherein said at least one light deflector is designed and arranged so that said first and second light bundles reflected by said first reflector are incident on said second reflector after intersecting each other, and wherein said light intercepting member is positioned between said first reflector and said second reflector.

11. The multipoint focus detecting apparatus according to claim 9, wherein said multipoint focus detecting apparatus is incorporated in an SLR camera.

12. The multipoint focus detecting apparatus according to claim 9, wherein said light intercepting member comprises an opening.

13. The multipoint focus detecting apparatus according to claim 2, wherein said multipoint focus apparatus is incorporated into an SLR camera.

* * * * *